United States Patent Office.

DAVID STEWART, OF ANNAPOLIS, MARYLAND.

IMPROVED METHOD OF PREPARING BONES FOR FERTILIZING PURPOSES.

Specification forming part of Letters Patent No. 25,772, dated October 11, 1859.

*To all whom it may concern:*

Be it known that I, DAVID STEWART, of Annapolis, in the county of Anne Arundel and State of Maryland, have invented a new Improvement in Composts; and I do hereby declare that the following is a full, clear, and exact description of the principle or character which distinguishes it from all other things before known, and of the usual manner of making, modifying, and using the same.

My improvement in the preparation of bones for fertilizing purposes consists in combining animal and vegetable substances with bones in such manner that the changes always progressing in animal substances above 40° Fahrenheit insure the rapid and perfect fermentation of the vegetable substances, and the temperature, acids, and catalytic force thus produced dissolve the bones or reduce them to a soft pulpy mass.

My improvement also consists in a certain arrangement, disposition, or manner of using the several materials of the compost by which the escape of valuable volatile products is prevented, they being arrested and condensed in forms available for manures, and also the escape of offensive and poisonous gases is prevented.

First. Having observed the fact that bones are sometimes dissolved when buried in a dungheap, and that crushed bones under peculiar circumstances are by spontaneous action reduced to a pasty mass, I conclude that catalytic force, or the force produced during rapid fermentation, and a certain temperature are the conditions necessary to insure the rapid solution of bones, as above mentioned, so that it may not only sometimes happen, but be systematically produced by an arrangement of the several elements of compost, so as to insure rapid fermentation and the preservation of the temperature that results when highly organized and complex substances are rapidly resolved by exchange of elements into a more simple and fixed compound instead of change by slow combustion, or the change that results upon exposure of such substances to the action of oxygen of the air, &c.

Second. Starch, woody fiber, or lignine are usually converted into water and carbonic acid when they decay in the air—sometimes into gum, sugar, alcohol, &c.—but when associated with animal matter at a temperature of about 95° Fahrenheit they are converted into lactic and butyric acids, or more fixed products, which remain in the compost. Moreover, the nascent hydrogen liberated during these changes does not escape, but combines with the nascent nitrogen of the animal and other proteine compounds abundantly present and forms ammonia.

Third. Proteine compounds or amidogen compounds—such as sulphannide, phosphamide, &c.—combine with lime, and especially with the silicate of lime, which always exist in old mortar and leached ashes, so as to generate ammonia and nitrate of lime, potash, and soda, if these alkalies are present.

My improved animal compost consists in the systematic arrangement of bones and the soft parts of animals with vegetable matter and the mineral elements, lime, potash, and silica, so that the whole mass being composed of elements universally recognized as valuable fertilizers by themselves, the money value of which compost is much greater than the value of its separate elements, not only because the effect is increased by mixture, and the effect of one element is rendered more certain by association with another, but because of the fine state of division to which all its elements spontaneously, and that without the expensive apparatus and manipulation that attend the preparation of animal compounds and manures now in use. Again, the relative proportion of the azotized elements is much greater than in the ordinary compost, where the elements are indiscriminately mixed, producing exceedingly noxious and poisonous exhalations and the escape of the valuable fertilizing materials. It is known that when lime is mingled with clay that is perfectly insoluble in water it liberates potash and silica from the clay at ordinary temperatures. I have found the same result on mixing lime with powdered feldspar, and upon the same principle I claim to use powdered feldspar and green sand mixed with a great excess of lime as a substitute for old mortar and leached ashes, where the latter cannot be had in sufficient quantity. The reaction of lime on the silicate of potash in feldspar and green sand is such as not only to render the potash in a soluble state, but also to liberate silica in a soluble form from both these minerals, and thus affords nourishment to the plants direct from the mineral itself, lime being a substitute for heat, it being admitted that lime by the aid of heat will dissolve these minerals in a few moments. It has long been my opinion that this will be the mode of applying lime to land when more is known of its operations. In other words, the most economical use of lime is in the form of mineral compost, as indicated above, and I attribute the value of old plastering to the action of lime on the sand in the mortar. My compost may thus be called "an animal and mineral compost," and the arrangement and disposition of the materials is substantially as follows: The materials are piled in regular and distinct layers or strata within any suitable inclosure.

The animal compost is composed of the following materials arranged in separate strata, as indicated in annexed diagram, the exact proportions not being of so much importance as their stratification or arrangement, and the total number of strata in any one compost being subject to the convenience of the manfacturer, provided the number of strata comprising each series be completed, one series being composed of five strata, so that a compost may be perfect, though composed of only one complete series of five (5) different strata, or it may be composed of seven series containing the twenty-nine strata—viz., two of A, surrounding each series, and one of C, in the center of each series; also two of B enveloping C (on all sides) in each series.

"A" stratum is composed of a mixture of equal parts leached ashes and old mortar, or the plastering of old houses; or, "$A^{4O}$", six tons of unleached ashes mixed with slaked oyster-shell or other lime, two tons; or, "$A^5$", Jersey or other green sand, volcanic dust or pozzolana, powdered feldspar containing from six to sixteen per cent. of potash mixed with an equal bulk of slaked lime.

Stratum B is composed of stable-manure, refuse potatoes or grain, vegetable matter containing starch being preferred—such as contents of stomachs of dead animals.

Stratum C is composed of refuse animal matter from slaughter-houses, &c., consisting of bones, blood, hair, and the soft parts of animals, condemned herring, and other refuse animal matter that is generally abundant in large cities where several thousand animals are slaughtered or die every day.

The most convenient mode of arranging the compost is found to be as follows, but instead of using an inclosure of boards an earthen wall may be substituted by making an excavation like that for a cellar. An inclosure made with boards supported by posts, like a common board fence—say twelve or fifteen feet square—has been found the most convenient arrangement. The lower boards of the inclosure having been placed inside of the posts, the stratum A is introduced and spread over the whole surface—say two hundred square feet "from out to out."

This lower stratum may be composed of four thousand pounds, or about two tons, of either of the following mixtures, viz: A, $A^{4O}$, $A^5$, or the screenings from a former compost. (Gas-lime, and the spent lime or soda lime of the soap-boiler being substituted sometimes for the floor or foundation.)

"B." Upon top of this one thousand pounds of stable-manure, or "B," which must not extend "from out to out" of the inclosure, but leave a margin of about one foot on each side, or cover a surface of one hundred and forty-four square feet.

"C." Upon top of B two thousand pounds of animal refuse and bones. (If the bones are large, they should be cracked or crushed, whether green or dry.) This stratum should not extend to the margin of B, but cover about one hundred square feet of its surface. The margin around these several strata being filled up with either A, $A^4$, or $A^5$, the first series is completed by the addition of another stratum of B, precisely as before, and on top of this another stratum of A, $A^4$, or $A^5$, as will more distinctly appear in the following diagram:

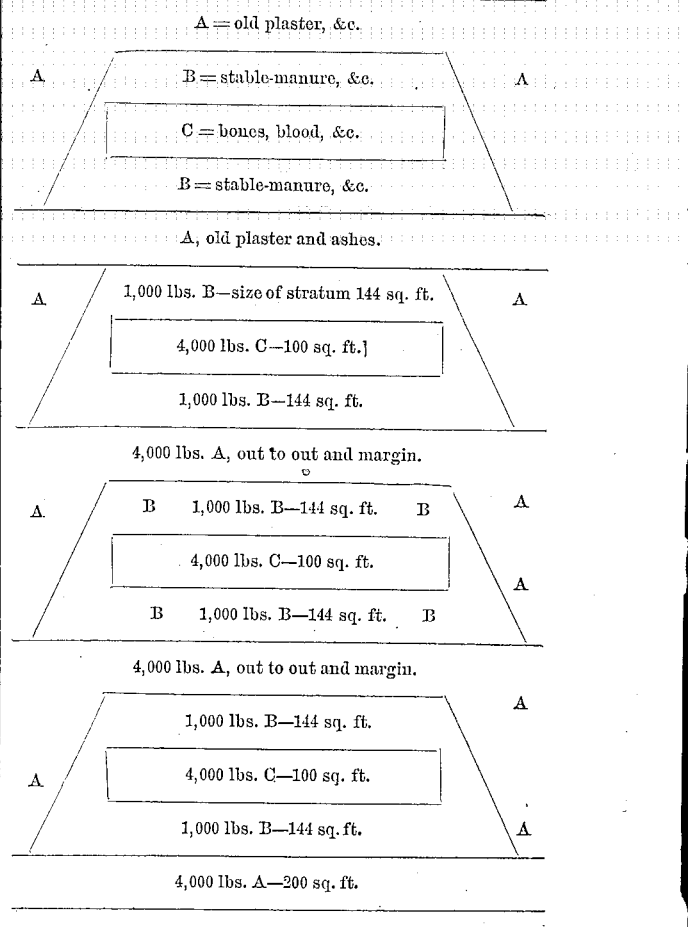

I do not claim the stratification of materials in the preparation of composts, nor do I claim the use of the materials above designated, or their equivalents, in the preparation of manures; but I confine my claim to the stratification of the materials above specified in the order specified.

What I claim as my improvement in the preparation of bones for fertilizing purposes is—

The stratification of the bones with materials—animal, vegetable, and mineral—substantially in the order and upon the principles herein set forth, using the materials above designated, or their equivalents, whereby bones are reduced in a most economical manner to an available condition for manure and a thorough compost obtained adapted to all the necessities of growing and fruiting plants without any mechanical labor other than that of stratifying, cutting down, and screening, as hereinabove set forth.

April 22, 1859.

DAVID STEWART.

Witnesses:
WM. GLOVER,
R. E. GLOVER.